(12) United States Patent
Kohlstruk et al.

(10) Patent No.: US 6,548,696 B2
(45) Date of Patent: Apr. 15, 2003

(54) LOW MONOMER 1:1-MONOADDUCTS FROM HYDROXY (METH) ACRYLATES AND DIISOCYANATES AND A PROCESS FOR THEIR MANUFACTURE

(75) Inventors: Stephan Kohlstruk, Marl (DE); Lothar Hayen, Herne (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/923,316

(22) Filed: Aug. 8, 2001

(65) Prior Publication Data
US 2002/0049349 A1 Apr. 25, 2002

(30) Foreign Application Priority Data
Aug. 8, 2000 (DE) .......................... 100 38 617

(51) Int. Cl.$^7$ .......................... C07C 69/52; C07C 69/00; C07C 69/34
(52) U.S. Cl. .......................... 560/224; 560/129; 560/132; 560/201
(58) Field of Search .......................... 560/129, 132, 560/201, 224

(56) References Cited

U.S. PATENT DOCUMENTS 4,572,610 A  2/1986  Krajewski et al.

FOREIGN PATENT DOCUMENTS

DE   198 00 528   7/1999

OTHER PUBLICATIONS

Antonucci et al, J. Dent. Res. 1980 vol. 51, No. 1, pp. 35 to 43.*
Thomas et al, Polym. Bull. 1992, vol. 29, No. 3–4, pp259–264.*
Matyshova et al, Ukr. Khim\., 1988, vol. 54, No. 11 pp. 1213–1216.*
CA 92 : 220648 Antonucci et al, J. Dent. Res. 1980, vol. 51, No. 1, pp. 35 to 43.*
CA 117: 252435 Thomas et al, Polym. Bull., 1992, vol. 29, No. 3–4, pp. 259–264.*
CA110 : 213984 Matyshova et a. Ukr. Khim., 1988, vol. 54 No. 11, pp. 1213–1216.*
Patent Abstracts of Japan, JP 1–092276, Apr. 11, 1989.

* cited by examiner

*Primary Examiner*—Al Rotman
*Assistant Examiner*—Hector M. Reyes
(74) *Attorney, Agent, or Firm*—Oblon, Spivak, McClelland, Maier & Neustadt, P.C.

(57) ABSTRACT

A low monomer 1:1-monoadduct from a diisocyanate and a hydroxy(meth)acrylate with a free diisocyanate content of less than 0.7% by weight and a free NCO content of 10.4–16.4% by weight can be used as a starting material for an acrylic or NCO functionalized crosslinker; a bonding agent for coatings and adhesives; and a linker for solid-phase synthesis of oligo-nucleotides, polynucleotides or peptides. The monoadduct is obtained by converting 5–20 mol diisocyanate with 1 mol hydroxy(meth)acrylate at a temperature of 40–120° C. in the presence of at least one inhibitor; subsequently separating a non-converted diisocyanate from a reaction product by short-path distillation at 80–220° C./0.1–10 mbar; feeding air, nitrogen monoxide or oxygen or a mixture containing (a) air, oxygen or nitrogen monoxide and (b) a proportion of 1–90% by volume of carbon dioxide, nitrogen, an inert gas or a mixture thereof through a reaction apparatus.

15 Claims, No Drawings

LOW MONOMER 1:1-MONOADDUCTS FROM HYDROXY (METH) ACRYLATES AND DIISOCYANATES AND A PROCESS FOR THEIR MANUFACTURE

BACKGROUND OF THE INVENTION

1. Field of the Invention

The invention relates to low monomer 1:1-monoadducts from hydroxy(meth)-acrylates and diisocyanates and a process for their manufacture.

2. Discussion of the Background

Because of their heterofunctionality, monoadducts from hydroxy(meth)acrylates and diisocyanates are valuable, versatile synthesis building blocks. Application fields are, for example, the preparation of acryl functionalized derivatives containing urethane groups formed by a reaction of the isocyanate group with monofunctional reagents or the manufacture of the respective acryl functionalized UV-curable resins by converting the isocyanate group with polyfunctional reaction partners. Further, it is possible to prepare polyisocyanates, for example through radically initiated homopolymerization or copolymerization of the (meth)acryl group. The reactivity of the NCO groups of these polymerizates allows easy access to customized polymers with unique properties under mild conditions.

The patent literature describes the use of olefinic unsaturated urethanes with an isocyanate function, for example, for the manufacture of crosslinkers (DE 35 01 493, U.S. Pat. No. 4,861,853) and self-crosslinking systems (U.S. Pat. No. 4,861,853), also on an aqueous basis (EP 0519 513).

Adducts from diisocyanates and hydroxy(meth)acrylates are traditionally obtained by converting the starting material in a molar ratio of 1:2. In this process the product has to be a mixture of heterofunctional monoadduct, bisadduct (1:2-adduct) and residual monomer in a ratio of approximately 1:1:1. By using an excess quantity of diisocyanate, the bisadduct content in the mixture can be suppressed. On the other hand, the residual monomer proportion rises. Employing an excess quantity of hydroxy(meth)acrylate causes an inverse effect to set in. The bisadducts no longer fulfill the desired heterofunctionality criterion, as opposed to the respective monoadducts. Bisadducts reduce the quality of the monoadduct and also have an effect on the quality and properties of the desired end products. The same considerations also apply to the excess starting diisocyanate that remains in the adduct. In addition, diisocyanates are very reactive compounds. Because of this, representatives of this substance class are to be classified as toxic. Therefore, a high residue of monomer diisocyanate in the product should be avoided at all costs.

It would be advantageous and desirable if the heterofuntionalized monoadduct formed by the conversion of hydroxy (meth)acrylates and diisocyanates did not exhibit the above disadvantages.

EP 0 623 591 describes the manufacture of olefinic unsaturated isocyanates, obtained by the conversion of diisocyanates with olefinic unsaturated alcohols (NCO/OH ratio of 4:1 to 40:1) and the subsequent removal of the excess starting isocyanate by short-path evaporation. The obtained products are low monomer, heterofunctional monoadducts, which, depending on the dimension of the isocyanate excess quantity, exhibit a more or less reduced bisadduct content. An attempt to transfer the manufacturing conditions of EP 0 623 591 to the products that are the subject of the present invention was unsuccessful. At the latest during the short-path evaporation process there was a gelling of the product mixture. Even when stabilizers such as hydroquinone, triphenyl phosphite or 2,2,6,6-tetramethyl-1-oxyl-piperidine were employed, gelling of the product mixture could not be stopped.

SUMMARY OF THE INVENTION

Thus, it is an object of the present invention to provide a process for the manufacture of low monomer 1:1-monoadducts from hydroxy(meth)acrylates and diisocyanates in which premature gelling of the product mixture is prevented.

It is another object of the present invention to provide low monomer 1:1-monoadducts from diisocyanates and hydroxy (meth)acrylates with a free diisocyanate content of less than 0.7% by weight and a free NCO content of 10.4–16.4% by weight.

This and other objects of the present invention have been achieved by providing a low monomer 1:1-monoadduct from a diisocyanate and a hydroxy(meth)acrylate, obtained by converting 5–20 mol diisocyanate with 1 mol hydroxy (meth)acrylate at a temperature of 40–120° C. in the presence of at least one inhibitor until said hydroxy (meth) acrylate is fully converted;

subsequently separating a non-converted diisocyanate from a reaction product by short-path distillation at 80–220° C./0.1–10 mbar;

feeding air, nitrogen monoxide or oxygen or a mixture containing (a) air, oxygen or nitrogen monoxide and (b) a proportion of 1–90% by volume of carbon dioxide, nitrogen, an inert gas or a mixture thereof through a reaction apparatus as an inhibitor gas;

wherein said monoadduct has a free diisocyanate content of less than 0.7% by weight and a free NCO content of 10.4–16.4% by weight.

Further, the above objects have been achieved by providing a process for the manufacture of the low monomer 1:1-monoadduct from diisocyanate and hydroxy(meth) acrylate.

DETAILED DESCRIPTION OF THE INVENTION

Surprisingly, it has been found that it was possible to prevent premature gelling of the product mixture when the conversion of the diisocyanate and the hydroxy(meth) acrylate and the short-path evaporation are carried out in the presence of a combination of suitable inhibitors and inhibitive gases. The term "conversion" within the context of the present invention means "reaction" and "converting" means "reacting".

The present invention relates therefore to low monomer 1:1 monoadducts obtained from diisocyanates and hydroxy (meth)acrylates with a free diisocyanate content of less than 0.7% by weight and a free NCO content of 10.4–16.4% by weight, obtained by converting 5–20 mol diisocyanate with 1 mol hydroxy(meth)acrylate at a temperature range of 40–120° C. in the presence of inhibitors. The monoadducts of the present invention have a content of free diisocyanate of below 0.7% by weight. They are difunctional monomers containing urethane groups with a reactive isocyanate group and a polymerizable double bond. Both functional groups can enter chemical reactions independent of one another. The respective other function remains unaffected and is available for further conversions.

The reaction of diisocyanate with hydroxy(meth)acrylate to obtain the monoadducts of the present invention is carried out until the acrylate components are fully converted. Subsequently the non-converted diisocyanate is separated from the reaction product by short-path distillation at 80–220° C./0.1–10 mbar. The temperature during the distillation includes all values and subvalues therebetween, especially including 90, 100, 110, 120, 130, 140, 150, 160, 170, 180, 190, 200 and 210° C. The pressure during the distillation includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5 mbar. Air, nitrogen monoxide, oxygen or a mixture of (a) air, oxygen or nitrogen monoxide, and (b) 1–90% by volume of carbon dioxide, nitrogen or inert gases or mixtures of these gases are fed through the reaction apparatus as an inhibitor gas.

Preferred isocyanates are aliphatic, cycloaliphatic and araliphatic, i.e. aryl substituted aliphatic diisocyanates, such as those described in Houben-Weyl, Methoden der Organischen Chemie, Volume 14/2, pp. 61–70 and in an article by W. Siefken, Justus Liebig's Annalen der Chemie 562, pp. 75–136, the relevant portions each of which are herein incorporated by reference. Preferred examples are 1,2-ethylenediisocyanate, 1,4-tetramethylene diisocyanate, 1,6-hexamethylene diisocyanate (HDI), 2,2,4-(2,4,4)-trimethyl-1,6-hexamethylene diisocyanate (TMDI), 1,9-diisocyanato-5-methylnonan, 1,8-diisocyanato-2,4-dimethyloctane, 1,12-dodecandiisocyanate, ω,ω'-diisocyanatodipropyl-ether, cyclobuten-1,3-diisocyanate, cyclohexan-1,3- and 1,4-diisocyanate, 3-isocyanato-methyl-3,5,5-trimethyl-cyclohexylisocyanate (isophorone diisocyanate, IPDI), 1,4-diisocyanatomethyl-2,3,5,6-tetramethyl-cyclohexane, decahydro-8-methyl-(1,4-methanol-naphthalene-2 (or -3), 5-ylendimethylene diisocyanate, hexahydro-4,7-methano-indan-1 (or 2), 5 (or 6) ylendimethylene diisocyanate, hexahydro-4,7-methanoindan-1 (or 2), 5 (or 6) ylene diisocyanate, 2,4- and 2,6-hexahydrotoluylene diisocyanate, perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane as well as any mixture of these compounds. Other preferred isocyanates are described in the listed articles in Siefken on page 122 ff. 2,5(2,6)-bis(isocyanatomethyl)bicyclo[2.2.1]heptane (NBDI) is preferred in the form of a pure substance or as a component of a mixture. Particularly preferred are the technically easily accessible aliphatic and cycloaliphatic diisocyanates and their isomer mixtures.

Preferred hydroxy(meth)acrylates are compounds according to Formula I, wherein $R^1$ contains 2–25 C atoms and can be a branched or unbranched aliphatic residue, an alkyl substituted, cycloalkyl-substituted or unsubstituted cycloaliphatic residue, an araliphatic or an aromatic residue, and $R^2$ represents hydrogen or a methyl group.

Particularly preferred are technically easily accessible hydroxy(meth)acrylates such as hydroxybutylacrylate, hydroxybutylmethacrylate, hydroxyethylacrylate (HEA) and hydroxyethylmethacrylate (HEMA).

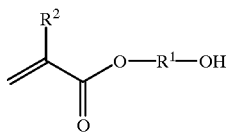

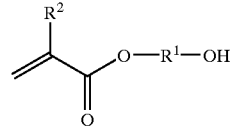

Formula I

Inhibitors are employed to stabilize the reaction mixture of diisocyanate and hydroxyacrylate as well as the low monomer monoadducts of the present invention. Inhibitors are understood to be substances that hinder or stop chain reactions such as auto oxidation or polymerization. These are, for example, phenolic antioxidants, aromatic amines, thioether, phosphoric acid ester and their mixtures.

Preferred antioxidants are, for example, pyrocatechol, 4-methoxyphenol, 4-tert.-butyloxyphenol, 4-benzyloxyphenol, α-naphthol, β-naphthol, phenothiazine, 10–10-dimethyl-9,10-dihydroacridine, bis-[2-hydroxy-5-methyl-3-cyclohexylphenyl]-methane, bis-[2-hydroxy-5-methyl-3-tert.-butylphenyl]-methane, hydroquinone, pyrogallol, 3,4-dihydroxy-1-tert.-butylbenzene, 4-methoxy-2(or 3)-tert.-butyl phenol (BHA), BHA also in combination with bis-[2-carboxyethyl]-sulfide (TDPA), 4-methyl-2,6-di-tert.-butyl phenol (BHT), bis-[4-hydroxy-2-methyl-5-tert.-butyl phenyl]-sulfide, 4-butylmercaptomethyl-2,6-di-tert.-butyl phenol, 4-hydroxy-3,5-di-tert.-butyl-phenylmethane sulfonic acid-dioctadecylester, 2,5-dihydroxy-1-tert.-butyl benzene, 2,5-dihydroxy-1,4-di-tert.-butyl benzene, 3,4-dihydroxy-1-tert.-butyl benzene and 2,3-dimethyl-1,4-bis-[3,4-dihydroxyphenyl]-butane as well as mixtures of these inhibitors.

It is preferred to combine the phenolic antioxidants with phosphoric acid esters according to Formula II, wherein each of $X^1$, $X^2$, and $X^3$ is independently oxygen or sulfur, and wherein $R^1$, $R^2$ and $R^3$ independently represent the same or different alkyl, alkylene(1)-yl, aryl or aralkyl residues with 1–20 C atoms.

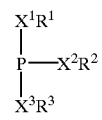

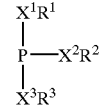

Formula II

More preferably, the phenolic antioxidants can be combined with thioethers or amines, such as 2-anilinonaphthalene (PBN), 1-anilinonaphthalene (PAN) or 1,4-dianilinobenzene. Of course, other substances that are available on the market can be used. Preferred are substances which have a chemical structure that unites several polymerization inhibiting principles. Particularly preferred is 2,2'-thio-bis-(4-tert.-octylphenol). Furthermore, preferred are phenothiazine, 2,6-di-tert.-butyl-4-(4,6-bis(octylthio)-1, 3,5-triazine-2-yl-aminophenol and 4-methyl-2,6-di-tert.-butyl-phenol and 4,4'-methylene-bis-2,6-di-tert.-butyl phenol.

The free NCO content of the compounds manufactured according to the present invention is 10.4 to 16.4% by weight. The free NCO content includes all values and subvalues therebetween, especially including 11, 11.5, 12, 12.5, 13, 13.5, 14, 14.5, 15, 15.5 and 16% by weight. The residual quantity of monomer diisocyanate is less than 0.7% by weight. The viscosity of the compounds manufactured according to the present invention at room temperature varies over a wide range from 80 to 35,000 mPas. The viscosity includes all values and subvalues therebetween, especially including 100, 500, 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000 and 34000 mPas.

The molar ratio of diisocyanate and hydroxy(meth)acrylate depends on which content of bisadduct is desired. The higher the excess quantity of diisocyanate, the lower the content of urethanized diacryl compound. Conversion of the two components is preferably carried out at 20–160° C. The conversion temperature includes all values and subvalues therebetween, especially including 30, 40, 50, 60, 70, 80, 90, 100, 110, 120, 130, 140 and 150° C. To accelerate the NCO/OH reaction, catalysts such as dibutyl laurate can be employed. However, the use of catalysts leads to increased moisture sensitivity of the product mixture and of the end product that has been freed of excessive diisoyanate.

Excess diisocyanate is removed by distillation, preferably by the use of a film evaporator or a falling-film evaporator. The short-path distillation is carried out at 80–220° C./0.1–10 mbar in the presence of an inhibitor gas. The temperature and vacuum are adjusted to suit the viscosity behavior of the respective products and are also a function of the optimum gas flow. The short-path evaporator can be made of any material as long as it is inert to the reaction conditions and reactants employed. Preferably, the evaporator is a glass or a metal apparatus. The inhibitor gas can be any gas that hinders or stops chain reactions such as auto oxidation or polymerization or quenches the reaction between diisocyanate and hydroxy(meth)acrylate. A preferred inhibitor gas is oxygen or a mixture of oxygen in any inert gas or mixture of inert gases. Instead of oxygen, nitrogen monoxide can also be employed. Depending on the dimensions of the individual components of the short-path evaporator, it can be advantageous to charge the product receiver with 0.001–0.5% by weight of 4-methyl-2,6-di-tert.-butyl-phenol before beginning the short-path evaporation. The amount of 4-methyl-2,6-di-tert.-butyl-phenol includes all values and subvalues therebetween, especially including 0.005, 0.01, 0.05, 0.1, 0.15, 0.2, 0.25, 0.3, 0.35, 0.4 and 0.45% by weight.

The subject of the present invention is also a process to manufacture low monomer 1:1 monoadducts from diisocyanates and hydroxy(meth)acrylates with a free diisocyanate content of less than 0.7% by weight and a free NCO content of 10.4–16.4% by weight. In this process 5–20 mol diisocyanate react with 1 mol hydroxy(meth)acrylate at a temperature of 40–120° C. in the presence of at least one inhibitors. The reaction is carried out until the acrylate components are fully converted and subsequently the non-converted diisocyanate is separated from the reaction product by short-path distillation at 80–220° C./0.1–10 mbar. Air, nitrogen monoxide, oxygen or a mixture containing (a) air, oxygen or nitrogen monoxide, and (b) a proportion of 1–90% by volume of carbon dioxide, nitrogen or inert gases or mixtures of these gases are fed through the reaction apparatus as an inhibitor gas.

The low monomer monoadducts of the present invention can be used as starting materials for the manufacture of acrylic or NCO-functionalized crosslinkers and bonding agents for coatings and adhesives. In the form of bifunctional and heterofunctional compounds, they can be used to manufacture customized, functionalized polymers and can also be used as linkers for solid-phase synthesis, e.g. of oligo and polynucleotides or oligo and polypeptides.

Having generally described this invention, a further understanding can be obtained by reference to certain specific examples that are provided herein for purposes of illustration only, and are not intended to be limiting unless otherwise specified.

EXAMPLES 1 to 8

General Manufacturing Instructions 1 mol hydroxy(meth)acrylate was added drop by drop to an intensively stirred mixture of 5 to 20 mol diisocyanate, 1000 ppm phenothiazine, 1000 ppm 2,6-di-tert.-butyl-4-(4,6-bis(octylthio)-1,3,5-triazine-2-ylaminophenol and 1000 ppm 4,4'-methylene-bis-2,6-di-tert.-butyl phenol at 75–85° C. After all the hydroxy(meth)acrylate was added the mixture was stirred at 90–95° C. until the alcohol components were fully converted. Then the batch was saturated with dry air and the diisocyanate that was not converted was separated by short-path distillation at 80–220° C. and 0.1–10 mbar, while a constant flow of inhibitor gas was fed through the apparatus.

The chemical and physical characteristics of the residue (reaction product) can be seen in Table 1.

TABLE 1

| Example | Diisocyanate | Hydroxy-acrylate | NCO [%] | Viscosity [mPas] | Monomer content [%] |
|---|---|---|---|---|---|
| 1 | IPDI | HEA | 12.0 | 13 300 | 0.4 |
| 2* | HDI | HEA | 14.2 | 80 | 0.1 |
| 3* | MPDI | HEA | 14.3 | 180 | 0.5 |
| 4 | TMDI | HEA | 12.0 | 370 | 0.4 |
| 5 | IPDI | HEMA | 11.7 | 14 100 | 0.5 |
| 6 | HDI | HEMA | 13.6 | 105 | 0.2 |
| 7 | MPDI | HEMA | 13.8 | 220 | 0.4 |
| 8 | TMDI | HEMA | 11.7 | 460 | 0.5 |

*Product tended to crystallize

The priority document of the present application, German patent application DE 10038617.2, filed Aug. 8, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A 1:1-monoadduct of a diisocyanate and a hydroxy(meth)acrylate, prepared by reacting a diisocyanate with a hydroxy(meth)acrylate at a molar ratio of 5–20 moles of the diisocyanate to 1 mole of the hydroxyl(meth)acrylate, and at a temperature of 40–120° C. in the presence of at least one inhibitor, until the hydroxyl groups of the hydroxy(meth)acrylate are fully reacted with the diisocyanate, thereby providing a reaction product comprising the 1:1-monoadduct and unreacted diisocyanate;

contacting the reaction product with air, nitrogen monoxide or oxygen or a mixture comprising (a) air, oxygen or nitrogen monoxide, and (b) 1–90% by volume of carbon dioxide, nitrogen, an inert gas or a mixture thereof while separating unreacted diisocyanate from the reaction product by short-path distillation at 80–220° C./0.1–10 mbar;

wherein after said separation the monoadduct has a free diisocyanate content of less than 0.7% by weight and a free NCO content of 10.4–16.4% by weight.

2. The monoadduct according to claim 1, wherein said hydroxy(meth)acrylate is a compound of Formula I:

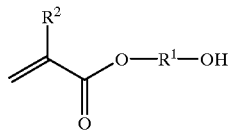

Formula I wherein
$R^1$ is a branched or unbranched aliphatic group, a cycloaliphatic, araliphatic or aromatic group with 2–25 C atoms; and
$R^2$ is hydrogen or a methyl group.

3. The monoadduct according to claim 2, wherein said hydroxy(meth)acrylate is selected from the group consisting of hydroxybutyl acrylate, hydroxybutyl methacrylate, hydroxyethyl acrylate, hydroxyethyl methacrylate and a mixture thereof.

4. The monoadduct according to claim 1, wherein said diisocyanate is an aliphatic diisocyanate, a cycloaliphatic diisocyanate, an isomer mixture of an aliphatic diisocyanate or an isomer mixture of a cycloaliphatic diisocyanate.

5. The monoadduct according to claim 4, wherein said diisocyanate is selected from the group consisting of isophorone diisocyanate, hexamethylene diisocyanate, methylpentane diisocyanate, 2,5(2,6)-bis(isocyanatomethyl) bicyclo[2.2.1]heptane, dicyclohexylmethane-4,4'-diisocyanate, dicyclohexyl-2,4'-diisocyanate, 1,3-diisocyanatomethylcyclohexane, 1,4-diisocyanatomethylcyclohexane, trimethylhexamethylene diisocyanate and a mixture thereof.

6. The monoadduct according to claim 4, wherein said diisocyanate is isophorone diisocyanate or trimethylhexamethylene diisocyanate.

7. The monoadduct according to claim 1, wherein said inhibitor is selected from the group consisting of a phenolic antioxidant, an aromatic amine, a thioether, a phosphoric acid ester and mixtures thereof.

8. The monoadduct according to claim 7, wherein said phenolic antioxidant is selected from the group consisting of pyrocatechol, 4-methoxyl phenol, 4-tert.-butyloxyphenol, 4-benzyloxyphenol, α-naphthol, β-naphthol, phenothiazine, 10–10-dimethyl-9,10-dihydroacridine, bis-[2-hydroxy-5-methyl-3-cyclohexylphenyl]-methane, bis-[2-hydroxy-5-methyl-3-tert.-butylphenyl]-methane, hydroquinone, pyrogallol, 3,4-dihydroxy-1-tert.-butylbenzene, 4-methoxy-2(or 3)-tert.-butyl phenol, a mixture of 4-methoxy-2(or 3)-tert-butyl phenol and bis-[2-carboxyethyl]-sulfide, 4-methyl-2,6-di-tert.-butyl phenol, bis-[4-hydroxy-2-methyl-5-tert.-butyl phenyl]-sulfide, 4-butylmercaptomethyl-2,6-di-tert.-butyl phenol, 4-hydroxy-3,5-di-tert.-butyl-phenylmethane sulfonic acid-dioctadecylester, 2,5-dihydroxy-1-tert.-butyl benzene, 2,5-dihydroxy-1,4-di-tert.-butyl benzene, 3,4-dihydroxy-1-tert.-butyl benzene, 2,3-dimethyl-1,4-bis-[3,4-dihydroxyphenyl]-butane and a mixture thereof.

9. The monoadduct according to claim 1, wherein said inhibitor is a mixture of a phenolic antioxidant with a phosphoric acid ester according to Formula II,

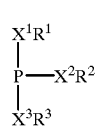

Formula II wherein
each of $X^1$, $X^2$, and $X^3$ is independently oxygen or sulfur; and
$R^1$, $R^2$ and $R^3$ each independently represent the same or different alkyl, alkylene(1)-yl, aryl or aralkyl groups with 1–20 C atoms.

10. The monoadduct according to claim 1, wherein said inhibitor is a mixture of a phenolic antioxidant with a thioether or an amine selected from the group consisting of 2-anilinonaphthalene, 1-anilinonaphthalene and 1,4-dianilinobenzene.

11. The monoadduct according to claim 7, wherein said phenolic antioxidant is selected from the group consisting of phenothiazine, 2,6-di-tert.-butyl-4-(4,6-bis(octylthio)-1,3,5-triazine-2-ylaminophenol, 4-methyl-2,6-di-tert.-butyl phenol, 4,4'-methylene-bis-2,6-di-tert.-butyl phenol and a mixture thereof.

12. The monoadduct according to claim 1, which has a viscosity of from 80 to 35,000 mPas.

13. A process for preparing a 1:1-monoadduct of a diisocyanate and a hydroxy(meth)acrylate having a free diisocyanate content of less than 0.7% by weight and a free NCO content of 10.4–16.4% by weight, comprising:

reacting the diisocyanate with the hydroxy(meth)acrylate at a molar ratio of 5–20 moles of the diisocyanate to 1 mole of the hydroxyl(meth)acrylate, and at a temperature of 40–120° C. in the presence of at least one inhibitor until the hydroxyl groups of the hydroxy (meth)acrylate are fully reacted with the diisocyanate, thereby providing a reaction product comprising the 1:1-monoadduct and unreacted diisocyanate;

contacting the reaction product with an inhibitor gas selected from the group consisting of air, nitrogen, nitrogen monoxide, oxygen, and a mixture containing (a) air, oxygen or nitrogen monoxide and (b) 1–90% by volume of carbon dioxide, nitrogen or an inert gas or a mixture thereof while separating the unreacted diisocyanate from the reaction product by short-path distillation at 80–220° C./0.1–10 mbar.

14. The process according to claim 13, further comprising:

charging a product receiver with 0.001–0.5% by weight of 4-methyl-2,6-di-tert.-butyl-phenol before said short-path distillation.

15. A linker for solid-phase synthesis of an oligonucleotide, a polynucleotide or a peptide, comprising:

the monoadduct according to claim 1.

* * * * *